(12) United States Patent
Blomstrand et al.

(10) Patent No.: US 11,851,101 B2
(45) Date of Patent: Dec. 26, 2023

(54) POWER ASSISTING STEERING SYSTEM AND A METHOD OF OPERATING A POWER ASSISTING STEERING SYSTEM

(71) Applicant: Volvo Truck Corporation, Gothenburg (SE)

(72) Inventors: Jesper Blomstrand, Härryda (SE); Anders Petersson, Torslanda (SE); Ahmed Abbas, Nödinge (SE)

(73) Assignee: Volvo Truck Corporation, Gothenburg (SE)

( * ) Notice: Subject to any disclaimer, the term of this patent is extended or adjusted under 35 U.S.C. 154(b) by 279 days.

(21) Appl. No.: 17/476,009

(22) Filed: Sep. 15, 2021

(65) Prior Publication Data
US 2022/0089213 A1    Mar. 24, 2022

(30) Foreign Application Priority Data

Sep. 24, 2020 (EP) .................................... 20197978

(51) Int. Cl.
*B62D 5/04*    (2006.01)
*B62D 9/00*    (2006.01)

(52) U.S. Cl.
CPC ............. *B62D 5/0463* (2013.01); *B62D 9/00* (2013.01)

(58) Field of Classification Search
CPC ................................. B62D 5/0463; B62D 9/00
See application file for complete search history.

(56) References Cited

U.S. PATENT DOCUMENTS

| 6,062,336 A * | 5/2000 | Amberkar | B62D 6/00 180/443 |
| 7,389,849 B2 * | 6/2008 | Williams | B62D 5/09 180/428 |
| 9,926,004 B2 * | 3/2018 | Blond | B62D 5/065 |
| 2013/0062138 A1 * | 3/2013 | Naitou | B62D 5/046 318/400.2 |

(Continued)

FOREIGN PATENT DOCUMENTS

| CN | 104443025 A | 3/2015 |
| CN | 104742966 A | 7/2015 |

(Continued)

OTHER PUBLICATIONS

Extended European Search Report for European Patent Application No. 20197978.8, dated Mar. 12, 2021, 9 pages.

*Primary Examiner* — Ramsey Refai
(74) *Attorney, Agent, or Firm* — Withrow & Terranova, PLLC

(57) ABSTRACT

The invention relates to a power assisting steering system for a vehicle having at least a first and a second steered wheel, the system comprising a control unit configured to receive input on a desired change of steering angle, a first and a second power generating device configured to provide power assisted steering for turning the first and the steered wheel, respectively. The control unit, in response to the received input, is configured to alternatingly activate and deactivate the first and second power generating device, respectively, so as to repeatedly and alternatingly provide power assistance to the first and the second steered wheel as the first and second steered wheels are turned to achieve the desired change of steering angle. The invention also relates to a method of operating a power assisting steering system.

13 Claims, 5 Drawing Sheets

(56) References Cited

U.S. PATENT DOCUMENTS

| | | | |
|---|---|---|---|
| 2013/0299271 A1* | 11/2013 | Endo | B62D 5/0484 180/446 |
| 2015/0239498 A1* | 8/2015 | Cao | B62D 5/061 180/422 |
| 2015/0298729 A1* | 10/2015 | Blond | B62D 5/04 180/443 |
| 2020/0102007 A1 | 4/2020 | Akutsu | |
| 2022/0111892 A1* | 4/2022 | Seiffer | B60K 17/356 |

FOREIGN PATENT DOCUMENTS

| | | |
|---|---|---|
| CN | 107140017 A | 9/2017 |
| JP | 2007203963 A | 8/2007 |

\* cited by examiner

POWER ASSISTING STEERING SYSTEM AND A METHOD OF OPERATING A POWER ASSISTING STEERING SYSTEM

RELATED APPLICATIONS

The present application claims priority to european patent application no. 97978.8, filed on Sep. 24, 2020, and entitled "POWER ASSISTING STEERING SYSTEM AND A METHOD OF OPERATING A POWER ASSISTING STEERING SYSTEM," which is incorporated herein by reference in its entirety.

TECHNICAL FIELD

The invention relates to a power assisting steering system for a vehicle having at least a first and a second steered wheel. The invention also relates to a vehicle comprising such a system. The invention further relates to a method of operating a power assisting steering system. The invention also relates to a computer program, to a computer-readable medium, and to a control unit.

The invention can be applied in heavy-duty vehicles, such as trucks, buses, and construction equipment, but may also be applied in other vehicles such as passenger cars. Although the invention will be mainly described with respect to a truck, the invention is not restricted to this particular vehicle but may also be used in other vehicles.

BACKGROUND

In vehicles, power assisting steering systems help the driver to steer the vehicle by augmenting the steering effort needed to turn the steering wheel, making it easier for the vehicle to turn and/or be maneuvered. There are various different configurations of power assisting steering systems, such as hydraulic, electric, or hybrid.

A drawback with existing power assisting steering systems is that they consume a lot of energy. This is particularly true for electric power assisting steering systems and for vehicles with high axle load. A drawback with hydraulic power assisting steering systems, which are normally provided with large-sized hydraulic pumps, is the large parasitic losses and low fuel efficiency.

It would be desirable to mitigate at least some of the above-mentioned drawbacks.

SUMMARY

An object of the invention is to provide a power assisting steering system that mitigates at least some of the drawbacks of existing systems.

The invention is based on the insight that by alternating the power assistance to the steered wheels, instead of providing power assistance to all the steered wheels simultaneously, a higher axle load may be allowed, and system components may be reduced in dimension. In particular, the inventors have realized that by concentrating the power assisting effort to only one steered wheel at a time or to only one steered axle (if there are two or more steered axles) at a time, the peak power consumption can be reduced. In contrast, traditional power steering turns all steered wheels at the same time, causing a high peak in energy consumption.

The above-mentioned objective is achieved by a power assisting steering system.

Thus, according to a first aspect of the invention, there is provided a power assisting steering system for a vehicle having at least a first and a second steered wheel, the system comprising:
a control unit configured to receive input on a desired change of steering angle,
a first power generating device configured to provide power-assisted steering for turning the first steered wheel, and
a second power generating device configured to provide power-assisted steering for turning the second steered wheel,
wherein the control unit, in response to the received input, is configured to alternatingly activate and deactivate the first and second power generating device, respectively, so as to repeatedly and alternatingly provide power assistance to the first and the second steered wheel as the first and second steered wheels are turned to achieve the desired change of steering angle.

By providing a power assisting steering system that alternatingly activates that first and second power generating device, respectively, i.e., by introducing individual steering of the steered wheels, the peak power consumption/peak load is reduced. By such reduction, components of the system may be downsized.

It should be understood that for vehicles that are only provided with one steered axle, the power assistance will be alternated between the wheels of that steered axle. However, for vehicles having two or more steered axles, the power assistance may be alternated between the steered axles and/or even between each individual wheel of all the steered axles. Thus, in the case of two or more steered axles, the above-mentioned first and second steered wheels may be provided on different steered axles or on the same steered axle. It follows that if there are four, six, or more steered wheels on a vehicle, then the power assistance may be alternating by taking power assisting one or more (but not all) steered wheels at a time. The various alternatives will be discussed further down in this disclosure.

The control unit may include a microprocessor, microcontroller, programmable digital signal processor, or another programmable device. The control unit may also, or instead, include an application-specific integrated circuit, a programmable gate array or programmable array logic, a programmable logic device, or a digital signal processor. Where the control unit includes a programmable device such as the microprocessor, microcontroller, or programmable digital signal processor mentioned above, the processor may further include computer-executable code that controls operation of the programmable device.

As will be discussed further down in this disclosure, the power generating devices may be electric or hydraulic. The power-generating devices may even be hybrid.

The repeated alternation of providing power assistance to the first and second steered wheels may be done rapidly so that a driver does not even notice it. The actual timing of when to change from providing power assistance to one steered wheel to providing power assistance to the other steered wheel may be done in different ways. The switching may, for instance, be time-based, i.e., after a certain elapsed time, or it may be based on other factors, such as load on the respective steered wheel or steered axle, or based on values of a physical property of the power generating device. The latter example is reflected in the following exemplary embodiment.

According to at least one exemplary embodiment, the system comprises a first sensor for measuring a value of a physical property of the first power generating device and a second sensor for measuring a value of the physical property of the second power generating device, each sensor being configured to provide the control unit with information relating to the measured values, wherein the control unit is configured to alternatingly activate and deactivate the first and second power generating device, respectively, based on the information provided by the first and the second sensor. By basing the alternation on measured values, the power assistance provided to the respective steered wheel may be improved. For instance, if the first and the second steered wheels are provided on a respective steered axle, then the physical properties may differ, and they may require different amounts of power assistance.

According to at least one exemplary embodiment, when one of the first and second power generating devices is in an activated state, and the measured value of its physical property reaches or exceeds a target value, then the control unit is configured to deactivate said power generating device and instead activate the other one of the first and the second power generating device. By basing the alternation on a target value, the control of the power generating device can be used efficiently. For instance, too high temperatures or pressures can be avoided, or too large power consumption for a power generating device may be avoided. This is reflected in the below exemplary embodiment.

Thus, according to at least one exemplary embodiment, the physical property is selected from the group consisting of:
  temperature, such as the temperature of a power generating device comprising a hydraulic cylinder,
  pressure, such as the pressure of a hydraulic cylinder of a power generating device,
  electric current, such as the electric current consumed by a power generating device comprising an electric motor.

According to at least one exemplary embodiment, the power assisting steering system comprises at least one actuator for selectively activating and deactivating the first and the second power generating device, respectively, wherein the control unit is configured to control the actuator. Thus, the at least one actuator may be a single component operatively connected to each one of the first and second steered wheels, or the at least one actuator may be two or more components operatively connected to both steered wheels or to a respective one of the steered wheels.

According to at least one exemplary embodiment, each one of the first and the second power generating devices comprises a hydraulic cylinder for providing power assistance to turn the respective steered wheel. Thus, the control unit may control the operation of the hydraulic cylinder, repeatedly alternating between the two hydraulic cylinders for providing alternating and repeated power assistance to the first and second steered wheels when the driver wants to turn the wheel.

According to at least one exemplary embodiment, the at least one actuator comprises at least one valve for opening and closing a fluid path to the respective hydraulic cylinder for selectively activating and deactivating the first and the second power generating device. The at least one valve may be a single valve, for instance, a three-way valve, which may close the fluid communication to one of the hydraulic cylinders while opening the fluid communication to the other one of the hydraulic cylinders, and vice versa. The opening and closing, i.e., the adjusting of the valve, are controlled by the control unit. In other exemplary embodiments, two or more valves may be provided. For instance, there may be provided one valve for each hydraulic cylinder, wherein the control unit opens one valve while closing the other valve, and vice versa.

According to at least one exemplary embodiment, each one of the first and second power generating devices comprises an electric motor for providing power assistance to turn the respective steered wheel. Thus, the control unit may alternatingly and repeatedly energize the electric motors.

According to at least one exemplary embodiment, the actuator is an electric actuator for opening and closing an electric current path to the respective electric motor for selectively activating and deactivating the first and second power generating device. There may, of course, be more than one electric actuator, such as one for each electric motor. Thus, the control unit may control the one or more electric actuators.

According to a second aspect of the invention, there is provided a vehicle comprising a power assisting steering system according to the first aspect, including any embodiment thereof. The advantages of the vehicle according to the second aspect correspond to those of the power assisting steering system according to the first aspect.

Since a vehicle may have one or more steered axles, there are numerous different possibilities for providing alternating and repeated power assistance to different vehicles. Some non-limiting examples will be presented hereinbelow.

According to at least one exemplary embodiment, the vehicle comprises a first steered axle and a second steered axle, wherein the first steered wheel is one of a pair of first wheels mounted to the first steered axle, wherein the second steered wheel is one of a pair of second wheels mounted to the second steered axle, wherein the control unit is configured to alternate between controlling provision of power assistance to the first steered axle and provision of power assistance to the second steered axle. Thus, in this exemplary embodiment, the power assistance is alternated between the wheels on the first steered axle, on the one hand, and the wheels on the second steered axle, on the other hand. The two steered wheels on the first steered axle are both considered as "first steered wheels." Similarly, the two steered wheels on the second steered axle are considered to represent "second steered wheels." Accordingly, when power assistance is provided to the first steered axle, at least one of the two first steered wheels should be provided with power assistance, while none of the two steered wheels on the second steered axle receives any power assistance. Then, when the control unit makes the switch, at least one of the two second steered wheels on the second steered axle is provided with power assistance, but none of the first steered wheels on the first steered axle is provided with power assistance.

In some exemplary embodiments, each one of the two first steered wheels of the first steered axle is provided with power assistance, while neither one of the two second steered wheels of the second steered axle is provided with power assistance, and vice versa (after the switch by the control unit). This allows for a simple yet power-efficient alternation between the first and second steered axles. Thus, even though steered wheels are power assisted one at a time, half the power load is needed, compared to all four wheels being power assisted simultaneously.

In some exemplary embodiments, when there are four or more steered wheels distributed on two or more steered axles, the power assistance may be sequential, assisting one steered wheel at a time. Thus, the control unit may provide power assistance to a first steered wheel, then to a second steered wheel, then to a third steered wheel, then to a fourth steered wheel (and any subsequent steered wheel), before reverting to provide power assistance to the first steered wheel.

According to at least one exemplary embodiment, the control unit is configured to receive input data on which one of the first and second steered axles carries a higher load than the other one and based on the input data control the distribution of the power assistance such that more power is provided to one of the first and second steered axles that carry higher load compared to the one that carries a lower load. This is advantageous since the turning of the wheels of an axle subjected to a higher load requires more power than one subjected to a lower load. Thus, by weighing the power assistance, more efficient control is obtainable.

According to at least one exemplary embodiment, one of the first and second steered axles is a front axle of the vehicle, wherein the control unit is configured to control the distribution of the power assistance such that more power is provided to the front axle than to the other one of the first and second steered axles. This is advantageous since the front axle is normally the one that is subjected to a higher load.

According to at least one exemplary embodiment, the first and second steered wheels are left and right wheels, respectively, provided on a common wheel axle. This common wheel axle may be the only steered axle of the vehicle. However, in some exemplary embodiments, it may be one of several steered axles.

According to at least one exemplary embodiment, the vehicle comprises a third steered wheel and a fourth steered wheel, wherein the control unit is configured to alternate between controlling provision of power assistance to the first, second, third, and fourth steered wheels. The sequence in which order the power assistance is provided may be selected by the control unit.

According to a third aspect of the invention, there is provided a method of operating a power assisting steering system for a vehicle having at least a first and a second steered wheel, and a first power generating device configured to provide power assisted steering for turning the first steered wheel and a second power generating device configured to provide power assisted steering for turning the second steered wheel, the method comprising:
  receiving input on a desired change of steering angle, and
  in response to the received input, alternatingly activating and deactivating the first and second power generating device, respectively, so as to repeatedly and alternatingly provide power assistance to the first and second steered wheel as the first and second steered wheels are turned to achieve the desired change of steering angle.

The advantages of the method according to the third aspect correspond to those of the power assisting steering system according to the first aspect and the vehicle according to the second aspect. Some exemplary embodiments of the method are listed below.

According to at least one exemplary embodiment, the method further comprises:
  measuring a value of a physical property of the first power generating device,
  measuring a value of the physical property of the second power generating device, and
  basing the step of alternatingly activating and deactivating the first and second power generating devices on the values of the measured physical property of the first and second power generating device.

According to at least one exemplary embodiment, the method further comprises:

deactivating the one of the first and second power generating devices that are in an active state when the value of its measured physical property reaches or exceeds a target value, and activating the other one of the first and second power generating devices.

According to at least one exemplary embodiment, the physical property is selected from the group consisting of:
  temperature, such as the temperature of a power generating device comprising a hydraulic cylinder,
  pressure, such as the pressure of a hydraulic cylinder of a power generating device,
  electric current, such as the electric current consumed by a power generating device comprising an electric motor.

According to a fourth aspect of the invention, there is provided a computer program comprising program code means for performing the steps of the method according to the third aspect, including any embodiment thereof, when the program is run on a computer.

According to a fifth aspect of the invention, there is provided a computer-readable medium carrying a computer program comprising program code means for performing the steps of the method according to the third aspect, including any embodiment thereof.

According to a sixth aspect of the invention, there is provided a control unit for power assisted steering, the control unit being configured to perform the steps of the method according to the third aspect, including any embodiment thereof.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
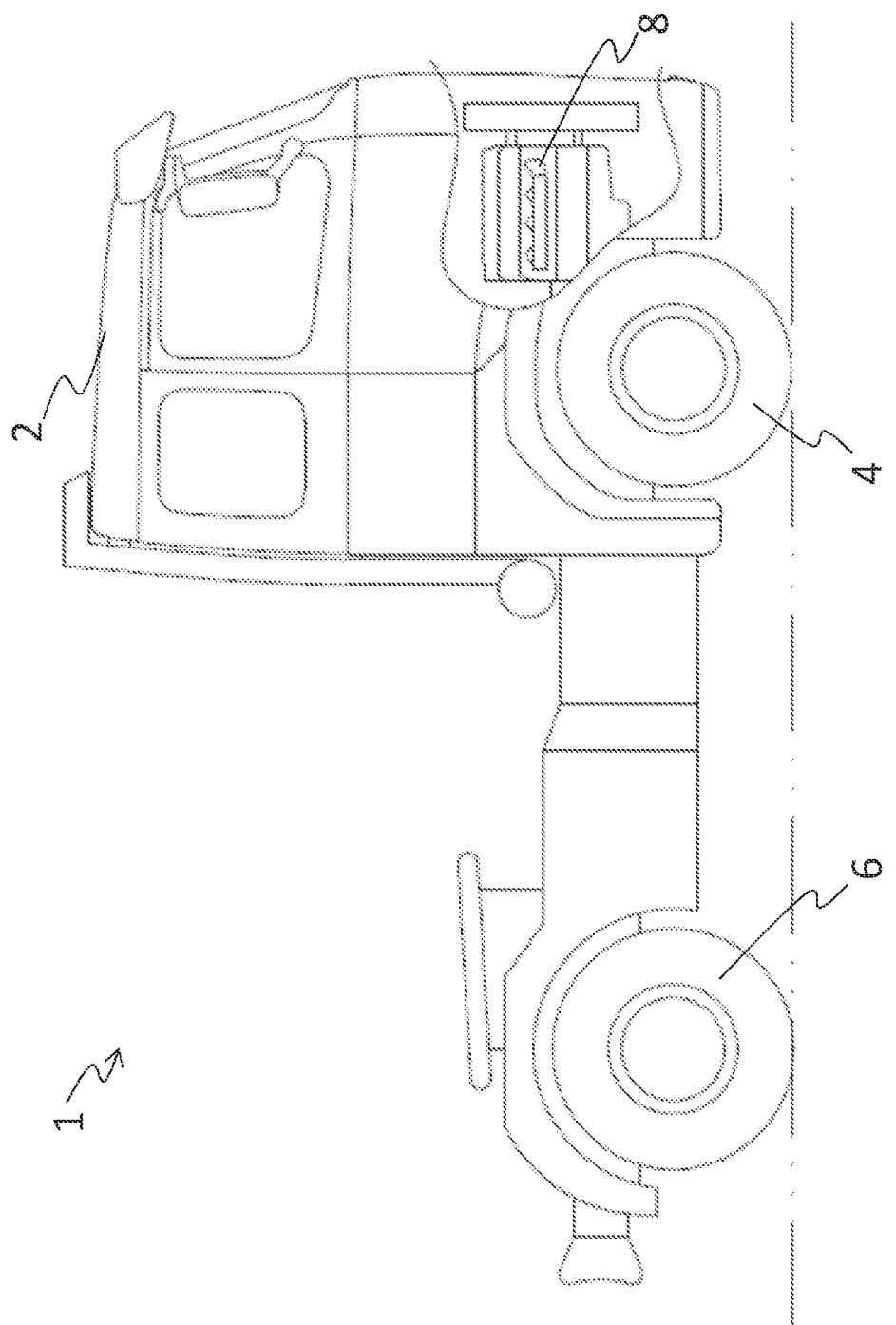
FIG. 1 illustrates a vehicle that may be provided with the inventive system in accordance with at least one exemplary embodiment of the invention.

FIG. 1 illustrates a vehicle 1, which may be provided with the inventive system, in accordance with at least one exemplary embodiment of the invention. Although the vehicle 1 is illustrated in the form of a truck, other types of vehicles, such as buses, construction equipment, trailers, or passenger cars, may be provided with the inventive system.

The vehicle 1 comprises a cabin 2 in which a driver may operate the vehicle 1. The vehicle 1 comprises a number of road wheels, herein illustrated as one front pair of wheels 4 and one rear pair of wheels 6. It should, however, be understood that in other embodiments, there may be a different number of wheels, such as two pairs of rear wheels.

The rotation of the wheels is accomplished by means of a suitable propulsion system, herein illustrated, by way of example, as an internal combustion engine system 8. However, it should be understood that other alternatives, such as fuel cells, traction batteries, etc., are conceivable sources of energy for driving the vehicle 1.

The vehicle has a steered axle on which the front wheels 4 are provided. Thus, the front wheels 4 are steered wheels. Using the terminology in this disclosure, the left front wheel may, for instance, be referred to as the "first steered wheel," and the right front wheel may be referred to as the "second steered wheel."

It should be understood that in other exemplary embodiments, both the front axle and the rear axle may be steered axles, in which case the "first steered wheel" may, in accordance with this disclosure, for instance, be regarded as the front left wheel, and the "second steered wheel" may be any one of the other wheels. Other examples may be referred to as the "first steered wheel" and the "second steered wheel" and are readily understandable. Naturally, there may be more than one "first steered wheel" (for instance, both front wheels 4) and more than one "second steered wheel" (for instance, both rear wheels 6). It should also be understood that in some exemplary embodiments, the vehicle has more than two steered axles. The vehicle 1 comprises a power assisting steering system (not shown in FIG. 1), as disclosed herein. Some exemplary embodiments of such a power assisting steering system will be discussed in the following.

Figure 2:
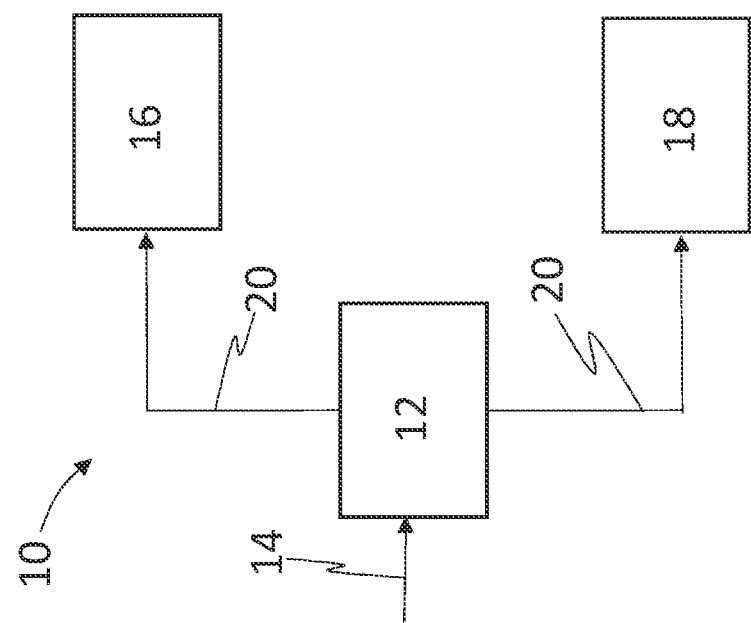
FIG. 2 is a schematic illustration of a power assisting steering system in accordance with at least one exemplary embodiment of the invention.

FIG. 2 is a schematic illustration of a power assisting steering system 10, in accordance with at least one exemplary embodiment of the invention. The power assisting steering system 10 is intended for a vehicle having at least a first and a second steered wheel (such as the vehicle 1 illustrated in FIG. 1 or any other suitable vehicle). The power assisting steering system 10 comprises a control unit 12 configured to receive an input 14 on a desired change of steering angle. The power assisting steering system 10 also comprises a first power generating device 16 and a second power generating device 18. The first power generating device 16 is configured to provide power assisted steering for turning the first steered wheel. The second power generating device 18 is configured to provide power assisted steering for turning the second steered wheel.

In response to the received input 14, the control unit 12 is configured to alternatingly activate and deactivate the first power generating device 16 and the second power generating device 18, respectively, so as to repeatedly and alternatingly provide power assistance to the first and second steered wheel as the first and second steered wheels are turned to achieve the desired change of steering angle. Thus, when the control unit 12 activates the first power generating device 16, it will also deactivate the second power generating device 18, and vice versa. This is performed repeatedly and, preferably, rapidly enough so that a driver does not even notice the alternating power assistance. The controlling of the first and second power generating devices 16, 18 are illustrated by respective output arrows 20 from the control unit 12. The control unit 12 may communicate with the power generating devices 16, 18 by wire or wirelessly.

Figure 3:
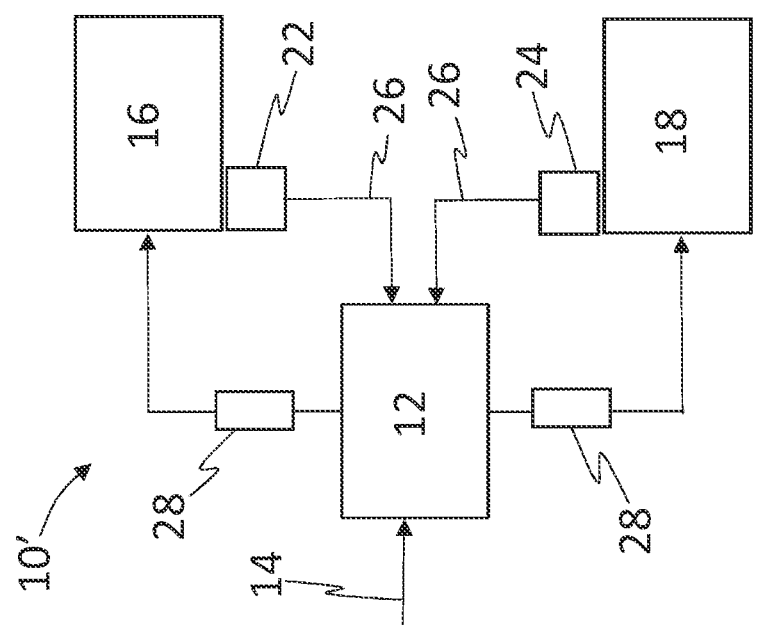
FIG. 3 is a schematic illustration of a power assisting steering system in accordance with at least another exemplary embodiment of the invention.

FIG. 3 is a schematic illustration of a power assisting steering system 10', in accordance with at least another exemplary embodiment of the invention. Similar to the power assisting steering system 10 in FIG. 2, the power assisting steering system 10' in FIG. 3 comprises a control unit 12, a first power generating device 16, and a second power generating device 18. Additionally, the power assisting steering system 10' comprises a first sensor 22 for measuring a value of a physical property of the first power generating device 16, and a second sensor 24 for measuring a value of the physical property of the second power generating device 18. Each sensor 22, 24 is configured to provide the control unit 12 with information relating to the measured values. This is depicted by the sensor input arrows 26. The control unit 12 is configured to alternatingly activate and deactivate the first and second power generating devices 16, 18, respectively, based on the information provided by the first and the second sensor 22, 24. In some exemplary embodiments, the control unit 12 may be in direct communication with the first and second power generating devices 16, 18, or as illustrated in FIG. 3, the control unit 12 may control the power generating devices via one or more actuators 28.

Thus, FIG. 3 illustrates that the power assisting steering system 10' may comprise at least one actuator 28 (two shown in FIG. 3) for selectively activating and deactivating the first and the second power generating device 16, 18, respectively. The actuator 28 is controlled by the control unit 12.

Each one of the first and second power generating devices 16, 18 may comprise a hydraulic cylinder for providing power assistance to turn the respective steered wheel. In such a case, the actuators 28 may comprise a valve for opening and closing a fluid path to the respective hydraulic cylinder for selectively activating and deactivating the first and second power generating devices 16, 18. Instead of having one valve for each power generating device 16, 18, the power assisting steering system 10' may in some exemplary embodiments have a single valve, such as a three-way valve which can alternatingly open and close the respective fluid path.

In the case of the first and second power generating devices 16, 18 comprising hydraulic cylinders, the physical property measured by the sensors 22, 24 may, for instance, be temperature (such as the temperature of the power generating device) and/or pressure (such as the pressure of the hydraulic cylinder).

In other exemplary embodiments, each one of the first and second power generating devices 16, 18 may comprise an electric motor for providing power assistance to turn the respective wheel. In such case, the one or more actuators 28 may be one or more electric actuators for opening and closing an electric current path to the respective electric motor for selectively activating and deactivating the first and second power generating device 16, 18, respectively. In such a case, the physical property measured by the sensors 22, 24 may be electric current (such as the electric current consumed by the power generating devices 16, 18 comprising the electric motors).

Regardless of if the first and second power generating devices 16, 18 are of the hydraulic type, the electric type, or a hybrid type, when one of them is in an activated state, and the value measured by the associated sensor 22 or 24 reaches or exceeds a target value, then the control unit 12 may be configured to deactivate that power generating device and instead activate the other power generating device. The sensors 22, 24 may communicate with the control unit 12 by wire or wirelessly.

It should be noted that although the sensors 22, 24, and the actuators 28 have been illustrated as separate components in FIG. 3, other configurations are also conceivable. For instance, in some exemplary embodiments, there may be provided actuators with integrated sensing. Furthermore, in some exemplary embodiments, the one or more actuators may be integrated in the control unit, which could then be depicted by a similar schematic illustration like the one in FIG. 2.

Each one of the control units 12 in FIG. 2 and FIG. 3 may comprise or may be comprised in a processing circuitry. The processing circuitry may include a microprocessor, microcontroller, programmable digital signal processor, or another programmable device. The processing circuitry may also, or instead, include an application-specific integrated circuit, a programmable gate array or programmable array logic, a programmable logic device, or a digital signal processor. Where the processing circuitry includes a programmable device such as the microprocessor, microcontroller, or programmable digital signal processor mentioned above, the processor may further include computer-executable code that controls operation of the programmable device. It should be understood that all or some parts of the functionality provided by means of the processing circuitry (or generally discussed as "processing circuitry") may be at least partly integrated with the control unit 12.

Figure 4:
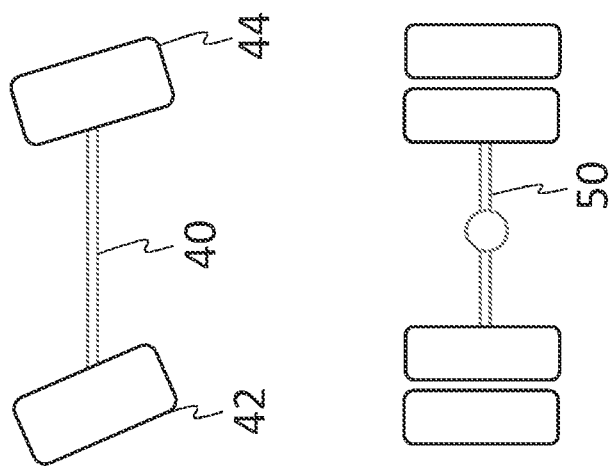
FIG. 4 is a schematic illustration of wheel axles carrying wheels, the illustration being provided for discussing at least one exemplary embodiment of the invention.

FIG. 4 is a schematic illustration of wheel axles carrying wheels, the illustration being provided for discussing at least one exemplary embodiment of the invention. In this exemplary embodiment, it is assumed that the vehicle has two axles 40, 50. The front axle 40 is a steered axle, while the rear axle 50 is a non-steering axle. Thus, in this example, one of the wheels 42, 44 on the steered axle 40 is considered to be a first steered wheel 42, and the other wheel on the steered axle 40 is considered to be a second steered wheel 44. In operation, the power assisting steering system will thus, alternatingly and repeatedly provide power assistance to the first steered wheel 42 and the second steered wheel 44 when the wheels 42, 44 are to be turned. Thus, the peak load/peak power consumption is reduced by half compared to if both steered wheels 42, 44 would be power assisted simultaneously in the traditional way.

Figure 5:
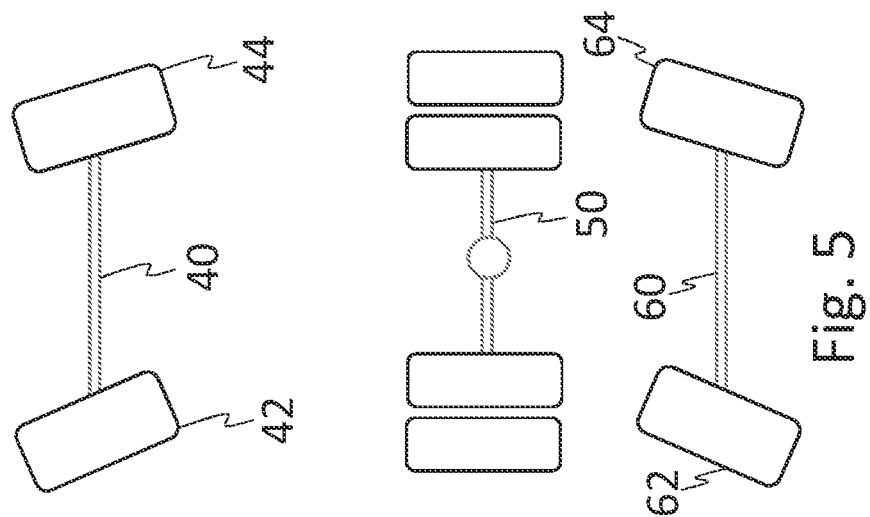
FIG. 5 is another schematic illustration of wheel axles carrying wheels, the illustration being provided for discussing at least another exemplary embodiment of the invention.

FIG. 5 is another schematic illustration of wheel axles carrying wheels, the illustration being provided for discussing at least another exemplary embodiment of the invention. In this example, the vehicle is assumed to have three axles 40, 50, 60. A front axle that is a first steered axle 40, a rear axle which is a second steered axle 60, and an intermediate axle which is a non-steering axle 50. Different control strategies are conceivable. The power assistance may, for example, be alternated between the first and second steered axles 40, 60, i.e., activating power assistance for the two steered wheels 42, 44 of the first steered axle 40 when deactivating power assistance to the two steered wheels 62, 64 of the second steered axle 60, and vice versa. In such a control strategy, switching between the axles 40, 60, i.e., activating two wheels at a time, the peak load/peak power consumption is reduced by half compared to if both steered axles 40, 60 with all four steered wheels 42, 44, 62, 64 would be power-assisted simultaneously in the traditional way. Another control strategy may be to simultaneously activate power assistance to one of the steered wheels 42, 44 of the first steered axle 40 and one of the steered wheels 62, 64 of the second steered axle 60, while power assistance to the other wheels is deactivated. A further control strategy is to provide power-assistance sequentially and to only one wheel at a time, for instance, left front steered wheel 42, then right front steered wheel 44, then left rear steered wheel 62, then right rear steered wheel 64, and then back to left front steered wheel 42, and so on. Any other order is, of course, also conceivable. For such control strategies in which only one wheel at a time is power assisted, there is a reduction of the peak load/peak power consumption to a fourth of the traditional way of power-assisting four wheels.

Figure 6:
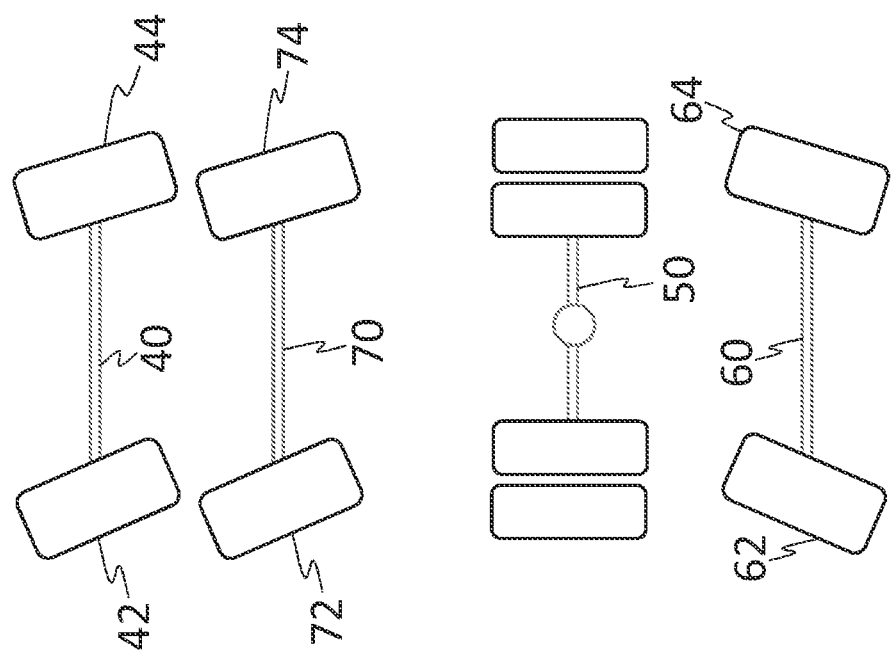
FIG. 6 is a further schematic illustration of wheel axles carrying wheels, the illustration being provided for discussing at least a further exemplary embodiment of the invention.

FIG. 6 is a further schematic illustration of wheel axles carrying wheels, the illustration being provided for discussing at least a further exemplary embodiment of the invention. In this example, it is assumed that the vehicle has four axles 40, 50, 60, 70. Two front axles that are both steered axles 40, 70, a rear axle that is also a steered axle 60, and an intermediate non-steering axle 50. Similar to the above discussions, there may be provided numerous control strategies. For instance, by providing power assistance to the wheels on one steered axle at a time, the peak load/peak power consumption is reduced to a third of what would be the case if power assistance were provided to all six steered wheels 42, 44, 62, 64, 72, 74 simultaneously. By providing power assistance to only one wheel at a time, the peak load/peak power assistance is reduced to a sixth of what would be the case if power assistance were provided to all six steered wheels simultaneously.

Figure 7:
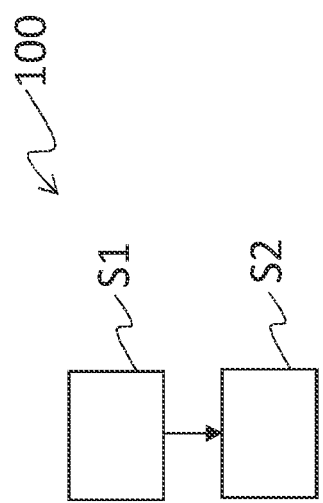
FIG. 7 is a schematic illustration of a method of operating a power assisting steering system, in accordance with at least one exemplary embodiment of the invention.

FIG. 7 is a schematic illustration of a method 100 of operating a power assisting steering system, in accordance with at least one exemplary embodiment of the invention. In particular, there is provided a method 100 of operating a power assisting steering system for a vehicle having at least a first and a second steered wheel, and a first power generating device configured to provide power assisted steering for turning the first steered wheel and a second power generating device configured to provide power assisted steering for turning the second steered wheel, the method 100 comprising:

in a first step S1, receiving input on a desired change of steering angle, and
   in a second step S2, in response to the received input, alternatingly activating and deactivating the first and second power generating device, respectively so as to repeatedly and alternatingly provide power assistance to the first and second steered wheel as the first and second steered wheels are turned to achieve the desired change of steering angle.

Figure 8:
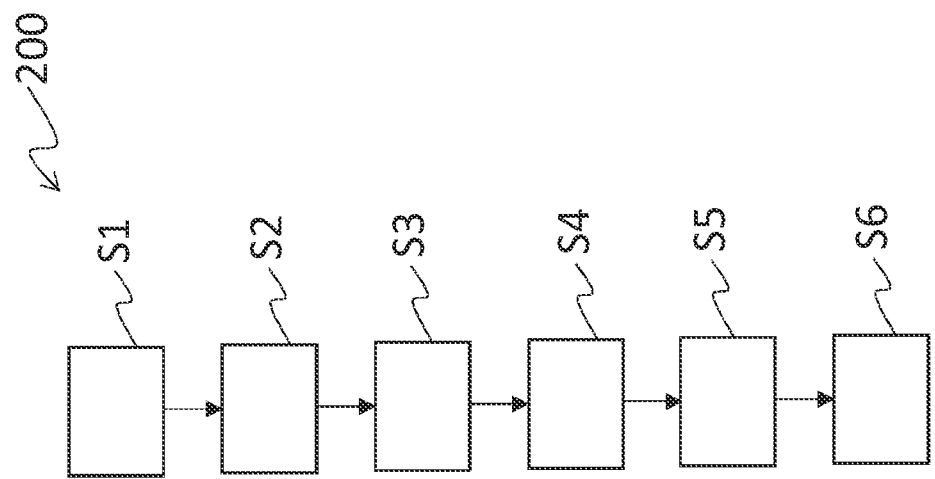
FIG. 8 is a schematic illustration of a method of operating a power assisting steering system, in accordance with at least another exemplary embodiment of the invention.

FIG. 8 is a schematic illustration of a method 200 of operating a power assisting steering system, in accordance with at least another exemplary embodiment of the invention. The first two steps S1 and S2, are the same as in FIG. 7. The method 200 may further comprise:

in a step S3, measuring a value of a physical property of the first power generating device,
   in a step S4, measuring a value of the physical property of the second power generating device, and
   in a step S5, basing the step S2 of alternatingly activating and deactivating the first and second power generating devices on the values of the measured physical property of the first and second power generating device.

The method 200 may further comprise:

in a step S6, deactivating the one of the first and second power generating devices that are in an active state when the value of its measured physical property reaches or exceeds a target value, and activating the other one of the first and second power generating devices.

It is to be understood that the present invention is not limited to the embodiments described above and illustrated in the drawings; rather, the skilled person will recognize that many changes and modifications may be made within the scope of the appended claims.

The invention claimed is:

1. A power assisting steering system for a vehicle having at least a first and a second steered wheel, the system comprising:
   a control unit configured to receive input on a desired change of steering angle,
   a first power generating device configured to provide power assisted steering for turning the first steered wheel, and
   a second power generating device configured to provide power assisted steering for turning the second steered wheel,
   wherein the control unit, in response to the received input, is configured to alternatingly activate and deactivate the first and second power generating device, respectively, so as to repeatedly and alternatingly provide power assistance to the first and the second steered wheels as the first and second steered wheels are turned to achieve the desired change of steering angle.

2. The system of claim 1, wherein the system further comprises:
   a first sensor for measuring a value of a physical property of the first power generating device, and a second sensor for measuring a value of the physical property of the second power generating device, each sensor being configured to provide the control unit with information relating to the measured values,
   wherein the control unit is configured to alternatingly activate and deactivate the first and second power generating device, respectively, based on the information provided by the first and the second sensor.

3. The system of claim 2, wherein when one of the first and second power generating devices is in an activated state, and the measured value of its physical property reaches or exceeds a target value, then the control unit is configured to deactivate one of the first or second power generating device and instead activate the other one of the first and the second power generating device.

4. The system of claim 3, wherein the physical property is at least one of temperature, pressure, and electric current.

5. The system of claim 4, comprising at least one actuator for selectively activating and deactivating the first and the second power generating device, respectively, wherein the control unit is configured to control the actuator.

6. The system of claim 5, wherein each of the first and the second power generating devices comprises a hydraulic cylinder or an electric motor for providing power assistance to turn the respective steered wheel.

7. The system of claim 6, wherein
   in the case of each of the first and the second power generating devices comprises a hydraulic cylinder, the at least one actuator comprises at least one valve for opening and closing a fluid path to the respective hydraulic cylinder for selectively activating and deactivating the first and the second power generating device, and
   in the case of each of the first and the second power generating devices comprises an electric motor, the at least one actuator is an electric actuator for opening and closing an electric current path to the respective electric motor for selectively activating and deactivating the first and second power generating device.

8. A vehicle (1) comprising:
   at least a first and a second steered wheel, and
   a power assisting steering system comprising:
      a control unit configured to receive input on a desired change of steering angle,
      a first power generating device configured to provide power assisted steering for turning the first steered wheel, and
      a second power generating device configured to provide power assisted steering for turning the second steered wheel,
      wherein the control unit, in response to the received input, is configured to alternatingly activate and deactivate the first and second power generating device, respectively, so as to repeatedly and alternatingly provide power assistance to the first and the second steered wheels as the first and second steered wheels are turned to achieve the desired change of steering angle.

9. The vehicle of claim 8, comprising a first steered axle and a second steered axle, wherein the first steered wheel is one of a pair of first wheels mounted to the first steered axle, wherein the second steered wheel is one of a pair of second wheels mounted to the second steered axle, wherein the control unit is configured to alternate between controlling provision of power assistance to the first steered axle and provision of power assistance to the second steered axle.

10. The vehicle of claim 9, wherein
    the control unit is configured to receive input data on which of the first and second steered axles carries a higher load than the other one and based on the input data control the distribution of the power assistance such that more power is provided to the first and second steered axles that carry the higher load compared to the one that carries a lower load, or
    the control unit is configured to control the distribution of the power assistance such that more power is provided to the front axle than to the other of the first and second steered axles, for a vehicle in which one of the first and second steered axles is a front axle of the vehicle.

11. The vehicle of claim 8, claim wherein the first and second steered wheels are left and right wheels, respectively, provided on a common wheel axle.

12. The vehicle of claim 11, comprising a third steered wheel and a fourth steered wheel, wherein the control unit is configured to alternate between controlling provision of power assistance to the first, second, third, and fourth steered wheels.

13. A method of operating a power assisting steering system, the method comprising:
    receiving input on a desired change of steering angle for a vehicle having at least a first and a second steered wheel, and a first power generating device configured to provide power-assisted steering for turning the first steered wheel and a second power generating device configured to provide power assisted steering for turning the second steered wheel, and
    in response to the received input, alternatingly activating and deactivating the first and second power generating device, respectively, so as to repeatedly and alternatingly provide power assistance to the first and second steered wheel as the first and second steered wheels are turned to achieve the desired change of steering angle.

* * * * *